June 11, 1935.  W. I. FOOTE  2,004,316
FISHHOOK
Filed July 9, 1934

Inventor
Wayland I. Foote

By Clarence A. O'Brien
Attorney

Patented June 11, 1935

2,004,316

UNITED STATES PATENT OFFICE 2,004,316

FISHHOOK

Wayland I. Foote, Griffin, Ga.

Application July 9, 1934, Serial No. 734,343

1 Claim. (Cl. 43—36)

This invention relates to a fish hook, the general object of the invention being to provide a spring member carrying a pair of fish hooks, with means for holding the parts with the hooks in overlapping relation so that when one hook is seized by a fish the parts will spring apart so that both hooks will enter parts of the mouth of the fish.

This invention also consists in certain other features of construction and in the combination and arrangements of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1:
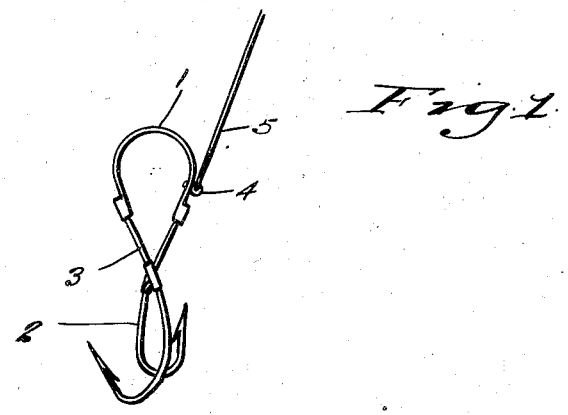
Figure 1 is a view showing the parts in closed position.
Figure 2:
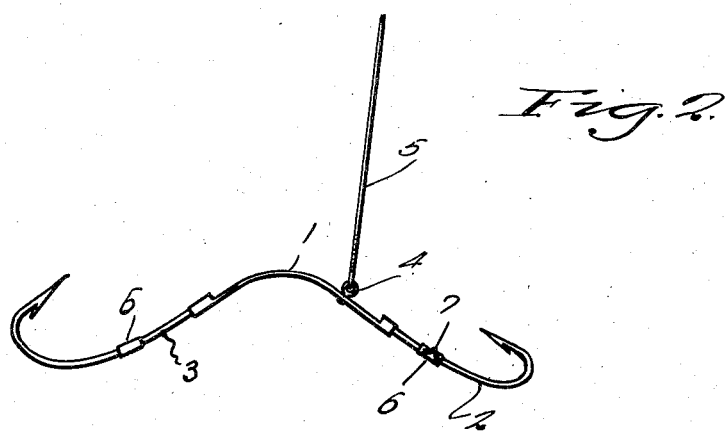
Figure 2 is a view with the parts in open position.
Figure 3:
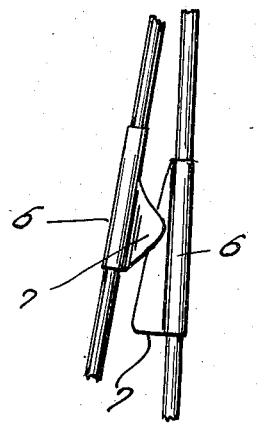
Figure 3 is an enlarged detail view showing the projections for holding the parts in set position.

In this drawing, the numeral 1 indicates a spring strip which has a small fish hook 2 connected to one end thereof and a large hook 3 connected to the other end. An eye 4 is carried by the strip adjacent the small hook for receiving the line or leader 5. A sleeve 6 is attached to the shank of each hook and each sleeve carries a fin-like projection 7 so that by placing the parts in the position shown in Figure 1 and engaging the projections as shown in Figure 3 the device will be held in the position shown in Figure 1. A bait is placed on the large hook 3 and when a fish strikes the large hook both hooks will enter the mouth of the fish and thus the hooks will spring apart and both hooks enter portions of the fish's mouth so as to firmly attach the fish to the line.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A fish hook comprising a strip spring member, a small fish hook attached to one end of the spring member, a large fish hook attached to the other end of the spring member, said spring member having an attaching eye nearer to the small hook, and a sleeve on each hook having a fin-like projection, said projections overlapping each other when the parts are folded thereby holding the parts in folded position by the tension of the strip spring and permitting the hooks to spring apart when the large hook is struck by a fish.

WAYLAND I. FOOTE.